United States Patent [19]

Rose

[11] 3,928,295

[45] Dec. 23, 1975

[54] AROMATIC POLYMERS CONTAINING KETONE LINKING GROUPS AND PROCESS FOR THEIR PREPARATION

[75] Inventor: John Brewster Rose, Letchworth, England

[73] Assignee: Imperial Chemical Industries Limited, London, England

[22] Filed: May 7, 1974

[21] Appl. No.: 467,798

[30] Foreign Application Priority Data

| | | |
|---|---|---|
| May 25, 1973 | United Kingdom | 25202/73 |
| May 25, 1973 | United Kingdom | 25205/73 |
| June 22, 1973 | United Kingdom | 29682/73 |
| Oct. 12, 1973 | United Kingdom | 47684/73 |
| Dec. 20, 1973 | United Kingdom | 59060/73 |
| Mar. 14, 1974 | United Kingdom | 11443/74 |

[52] U.S. Cl. ............ 260/79.3 M; 260/49; 260/63 R; 260/63 K; 260/63 HA; 260/79; 260/79.3 R; 428/426

[51] Int. Cl.$^2$ .................... C08G 2/00; C08G 75/20

[58] Field of Search ........... 260/79.3 M, 79.3 R, 79, 260/49, 63 R, 63 K, 63 HA

[56] References Cited
UNITED STATES PATENTS

| | | | |
|---|---|---|---|
| 3,442,857 | 5/1969 | Thornton | 260/79 |
| 3,764,583 | 10/1973 | Newton et al. | 260/79 |
| 3,787,363 | 1/1974 | Staniland et al. | 260/79.3 R |
| 3,794,615 | 2/1974 | Beverly | 260/79 |
| 3,795,660 | 3/1974 | Feasey et al. | 260/79 |

FOREIGN PATENTS OR APPLICATIONS

| | | | |
|---|---|---|---|
| 971,227 | 9/1964 | United Kingdom | 260/79.3 R |
| 1,016,245 | 1/1966 | United Kingdom | 260/79 |
| 1,078,234 | 8/1967 | United Kingdom | 260/79 |
| 1,153,527 | 5/1969 | United Kingdom | 260/79 |
| 1,164,817 | 9/1969 | United Kingdom | 260/79 |
| 1,177,183 | 1/1970 | United Kingdom | 260/79 |

*Primary Examiner*—Ronald W. Griffin
*Attorney, Agent, or Firm*—Cushman, Darby & Cushman

[57] ABSTRACT

A process for the preparation of aromatic polyketones and copolyketone/sulphones (ketone to sulphone content 75/25 to 100/0 having high molecular weight comprises heating dialkali metal salt of a bisphenol containing ketone linking groups with equimolar or slight molar excess of dihalobenzenoid compound having halogen atoms activated by a ketone or sulphone linking group in the presence of certain diaryl sulphones at 250° to 400°C.

14 Claims, No Drawings

AROMATIC POLYMERS CONTAINING KETONE LINKING GROUPS AND PROCESS FOR THEIR PREPARATION

This invention relates to aromatic polymers and in particular to aromatic polymers containing ketone linking groups and a process for their preparation.

A number of methods have been proposed for the preparation of aromatic polymers whose molecular chains comprise phenylene groups, oxygen atoms and ketone groups hereinafter referred to as polyketones and comprising units of the formula (I)

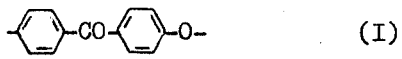

The polyketone chain may also contain biphenylene groups and may contain sulphone groups in place of some of the ketone groups. Such polymers also containing sulphone groups are hereinafter referred to as polyketone/sulphones.

British patent specification No. 971,227 describes a method of making a polyketone comprising units (I) by self condensation of 4-phenoxybenzoyl chloride in the presence of aluminium chloride and methylene chloride. The polymer is said to have a glass-rubber transition temperature of 185°C and show no sign of flowing at 350°C. The polymer could also be prepared by condensation of substantially equimolar amounts of diphenyl ether and bis(4-chlorocarbonylphenyl) ether, or by reaction of diphenyl ether with phosgene. British patent specification No. 1,164,817 describes similar condensation but carried out in the presence of boron trifluoride and hydrogen fluoride. Preparation of polyketone/sulphones and polyketones and polyketone/sulphones containing biphenylene groups is also envisaged. British patent specification No. 1,102,679 is similar to 1,164,817 except that carboxylic acids are used in place of acid halides. The polyketone comprising units (I) of patent specification No. 1,164,817 is said to have a crystalline melting point of 361°C, a glass transition temperature of 163°C, an inherent viscosity of 1.33 (as measured at 30°C in a 0.5% by weight solution in concentrated sulphuric acid) and to be capable of compression-moulding at 400°C into a stiff, tough film. A similar polyketone of patent specification No. 1,102,679 was said to have an inherent viscosity of 2.06.

Aromatic polysulphone consisting of units of the formula (II) is amorphous and repeated attempts to induce crystallisation have failed.

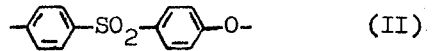

British patent specification No. 1,016,245 describes copolymers containing units (I) and (II) made by Friedel-Craft copolycondensation of 4-phenoxybenzoyl chloride and 4-phenoxybenzenesulphonyl chloride and copolymers containing 90, 78, 67, 46 and 36 mole % of units (I) were all said to be crystalline. Dutch patent application No. 7,202,048 describes polyketones said to consist of repeat units of the formula (I) or of repeat units of the formula (III)

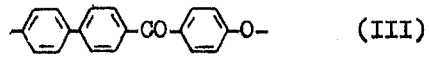

prepared by condensation of 4-phenoxybenzoic, or 4'-phenoxybiphenylcarboxylic, acid, acid halide or ester in the presence of boron trifluoride and hydrogen fluoride. The molecular weight of the polymer is controlled by the use of end-capping agents and the polymer is said to be melt-processable and resultant films and coatings are said to be tough.

The above routes are all electrophilic by nature and require the use of Lewis acid catalysts. It has also been proposed to prepare polyketones and polyketone/sulphones by nucleophilic condensation. British patent specification No. 1,078,234 describes a method of making the polymers by condensation of a dialkali metal salt of a dihydric phenol with a dihalo-benzenoid compound. An alternating polyketone/sulphone (IV) prepared in dimethyl sulphoxide was said to comprise repeat units of the formula

to be amorphous, and to have a glass-rubber transition temperature of 205°C and a reduced viscosity of 0.39 at 25°C in chloroform containing 0.2 g of polymer in 100 cm$^3$ of solvent, and to be capable of compression-moulding at 290°C to give extremely tough film. British patent specification No. 1,177,183 describes a polyketone made by self condensation of the potassium salt of 4-(4-fluorobenzoyl)phenol in 1,1-dioxothiolan (sulpholane) which is said to be crystalline and have a melting point of 375°C and reduced viscosity of 0.27 (measured at 47°C on a solution of the polymer in 4-chlorophenol containing 0.05 g polymer in 25 cm$^3$ of solution).

British patent specification No. 1,153,527 describes copolymers containing units (I) and (II) made by condensation of the alkali metal salts of 4-(4-halobenzoyl)-phenol and 4-(4-halophenylsulphonyl)phenol with elimination of alkali metal halide and copolymers containing 48, 50, 65, 75 and 80 mole % of unit (I) are said to be crystalline. Those containing 20, 35 and 47 mole % of units (I) are said to be amorphous. The specification teaches that copolymers having repeating units (I) and (II) and between 50 and 65 mole % of units (I) may be obtained in amorphous state but are crystallisable. The copolymers described in the specification have only low molecular weight, i.e. reduced viscosity of less than 0.3 [as measured at 25°C on a solution of the copolymer in dimethyl formamide containing 1 g of polymer in 100 cm$^3$ of solution (i.e. 1% w/v)].

A polyketone having units of the formula (III) can also be prepared as described in United States patent specification No. 3,764,583 by self condensation of bis-[4'-(4-chlorobenzoyl)biphenylyl] carbonate (V)

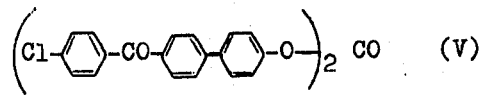

by initial hydrolysis in dimethyl sulphoxide in the presence of potassium hydroxide followed by polymerisation at 240°C in diphenyl sulphone, but the polymer although crystalline with a melting point of 418°C had a reduced viscosity of only 0.51 (as measured at 25°C in concentrated sulphuric acid solution containing 1 g of polymer in 100 cm³ of solution) and was capable of compression-moulding into only brittle film.

Hence it appears that tough, high molecular weight polyketones and polyketone-sulphones have not hitherto been prepared by a nucleophilic route.

According to the present invention a process is provided for the preparation of aromatic polymers having reduced viscosity of between 0.8 and 3.0, preferably between 1.0 and 2.0 [as measured at 25°C on a solution of polymer in concentrated sulphuric acid (density 1.84 g/cm³) containing 1 g of polymer in 100 cm³ of solution] whose molecular chains comprise 1,4-phenylene groups, oxygen atoms and ketone groups and optionally one or more groups selected from 4,4'-biphenylylene, terphenylylene and sulphone groups which comprises heating together at temperatures of 250° to 400°C (preferably at 280° to 350°C) in the presence of diaryl sulphone having the formula

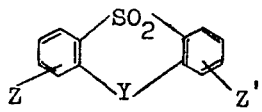

in which Y is a direct link, an oxygen atom or two hydrogen atoms (one attached to each benzene ring) and Z and Z' are selected from hydrogen atoms and phenyl groups and may be the same or different, a monomer mixture comprising (1). 49 to 50% molar of a di(alkali metal) salt of at least one bisphenol selected from

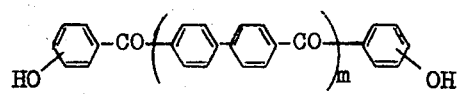

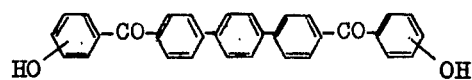

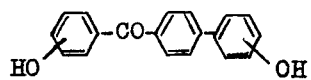

at least 95% of the phenolic OH groups being in the para position, and 2. 51 to 50% molar of at least one dihalo compound selected from

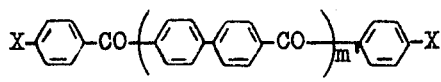

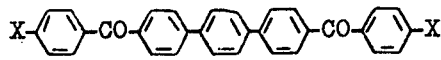

where X is F, Cl or Br, each of $m$ and $m'$ is zero, 1, 2, or 3, and some of the ketone groups may be replaced by sulphone groups provided that the proportion of sulphone groups (if present) to ketone groups in the monomer mixture is not greater than 25 mole % and the molar percentages of monomers in the mixture sum to 100%. It is preferred that the dihalo compound is present in slight excess for example 1.0% to 0.1%, preferably 0.5% to 0.1% (molar %). The preferred diaryl sulphone is diphenyl sulphone (i.e. Y, Z and Z' are all hydrogen atoms).

Accordingly the above aspect of the present invention represents a selection in the area of nucleophilic condensation polymerisation reactions for making polyketones and polyketone/sulphones. Firstly the reaction is carried out at a high temperature; secondly a solvent namely a diaryl sulphone is selected which is stable at that temperature and in which the di(alkali metal) salt of the bisphenol is only slightly soluble; and thirdly a particular combination of monomers has been selected i.e. the only nucleophile charged to the reaction mixture is the said di(alkali metal) salt of the bisphenol. Slight solubility of the said dialkali metal bisphenate in the aromatic sulphone is important; it must dissolve sufficiently to undergo the polycondensation reaction but must remain at a low concentration in the polymerisation reaction solution so as to reduce the risk of the ketone link being attacked by the nucleophile. Whilst the above procedure leads to increased reaction times over those exemplified in British patent specification Nos. 1,078,234 and 1,177,183, the resulting polymer has improved linearity and higher molecular weight and exhibits increased toughness.

The advantage gained by use of a solvent in which the said di(alkali metal) bisphenate is only slightly soluble is wholly unexpected in view of a paper by R. N. Johnson, A. G. Farnham, R. A. Clendinning, W. F. Hale and C. N. Merriam in Journal of Polymer Science 1967, Vol. 5, Part A–1, pages 2375 to 2398, which at pages 2378 to 2380 teaches that in polycondensation of a di(alkali metal) salt of a bisphenate with a dihalobenzenoid compound, the use of a dipolar aprotic solvent in which both polymer and said dialkali metal salt have highest solubility leads to polymers having highest molecular weight. The authors of this paper therefore preferred dimethyl sulphoxide, dimethyl sulphone and 1,1-dioxothiolan(sulpholane) and showed that the molecular weight of polymers prepared therein have higher molecular weight than that prepared in diphenyl sulphone.

The polymers made by the process of the present invention dissolve in concentrated sulphuric acid having density 1.84 g/cm³ to give pale yellow-straw coloured solutions. Polyketone/sulphones made by methods previously described produce deep red or brown coloured solutions in concentrated sulphuric acid. The polymeric materials made by the present process composed of repeating units I or I and II have an absorbance of 0.35 or less at a wavelength of 550 nm in a 10 mm cell using a solution of polymer in concentrated sulphuric acid (density 1.84 g/cm³) containing 1 g of polymer in 100 cm³ of solution (i.e. 1% w/v). Preferably the absorbance is less than 0.2. The low absorbance at 550 nm by solutions of the polymer made by the process of the present invention may perhaps by the result of reduced amount of chain branching. Inclusion of biphenylene units into the polymer chain appear to be associated with higher absorbance preferably less than 1.0 although it may be as high as 1.5. An excess of di(alkali metal) bisphenate leads to an increase in said absorbance and a polymer of low reduced viscosity, whereas an excess (greater than 51:49 molar ratio) of dihalo compound also leads to polymer having low reduced viscosity.

It has been found surprisingly that polymer provided by the process of the present invention in diaryl sulphone has higher molecular weight, and hence films therefrom have greater toughness, than polymers similarly prepared but using the preferred solvents of the above authors, two of whom (Johnson and Farnham) are named as inventors in respect of British patent specification No. 1,078,234 and a third (Clendinning) is named as inventor in respect of British patent specification No. 1,177,183.

The halogen atoms in the dihalo compounds for use in the process of the present invention are preferably chlorine or fluorine. The fluorine derivatives generally are more reactive and enable the displacement of alkali metal halide to be carried out more quickly, but are more expensive. Bromine derivatives are also relatively expensive and although they resemble the chlorine derivatives in performance they usually offer no advantages.

The dihalo compounds having the formulae

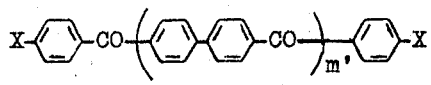

where $m'$ is 1, and

may be made by Friedel-Crafts condensation of 2 moles of 4-halobenzoyl chloride with 1 mole of biphenyl or terphenyl. The dihalo compound where $m' = 2$ may be made by Friedel-Crafts condensation of 4'-(4-halobenzoyl) biphenyl with phosgene in molar ratio 2:1. The dihalo compound where $m' = 3$ may be made by Friedel-Crafts condensation of 4'-(4-halobenzoyl)-biphenyl and biphenyl-4,4'-dicarbonyl chloride in molar ratio 2:1. Sulphone analogues of these dihalo compounds may be made in similar fashion. The corresponding bisphenols may be made by hydrolysis of the dihalo compounds. 4'-(4-Halobenzoyl) biphenyl may be prepared by Friedel-Craft condensation of equimolar amounts of 4-halobenzoyl chloride and biphenyl. The bisphenol having the formula

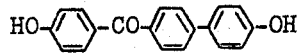

may be prepared by hydrolysis of the corresponding polycarbonate as described in Dutch patent application No. 7,109,794 or by hydrolysis of the chlorophenol having the formula

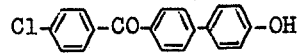

which is described in U.S. Pat. No. 3,764,583.

The alkali metal in the bisphenate for use in the process of the present invention is conveniently potassium or sodium.

The di(alkali metal) salt should be in a finely divided form having particle size less than 1 mm, preferably less than 500 μm.

The polymerization reaction should be carried out under substantially anhydrous conditions. The most likely source of water is the dialkali metal salt of the bisphenol because it is conveniently made by the reaction of alkali metal hydroxide with the bisphenol and the salt often contains water of crystallization. Thus the bisphenol may be stirred in an alkali metal hydroxide solution, in the ratio of 1 mole of bisphenol to two moles of hydroxide, until the bisphenol has dissolved, and then the water evaporated off e.g. by spray drying, to give the hydrated dialkali metal salt. The hydrated salt should therefore be dehydrated by removing the water for example by evaporation under reduced pressure or by heating the salt, preferably in the presence of diaryl sulphone, at a temperature above 150°C, preferably above 200°C and preferably under partial vacuum, e.g. 25 to 400 torr. A particular advantage in dehydration of the di(alkali metal) salt in the presence of diaryl sulphone in the polymerization vessel is that there is no splashing of the salt on the walls of the reaction vessel and hence stoichiometry of the polymerization reaction is maintained because the diaryl sulphone does not boil. The dihalo monomers can then be added after evolution of water (as evident for example by foaming) has ceased and temperature subsequently increased to the polymerization temperature. The polymerization is also preferably carried out in an inert atmosphere e.g. argon or nitrogen. The reaction vessel can be made from glass but is preferably made from stainless steels, other than those which undergo surface crazing at the reaction temperatures in the presence of alkali metal halide, or vessels made of or lined with titanium or nickel or an alloy thereof or some similarly inert material.

The polymerization reaction is carried out at temperatures between 250° and 400°C, preferably between 280° and 350°C. As with all chemical reactions, an increase in reaction temperature leads to shorter reaction times but with attendant risk of product decomposition whereas reduction in reaction temperature leads to longer reaction times but less product decomposition. However a temperature should be used which maintains polymeric material in solution. In general the solubility of polymer in diaryl sulphone increases with temperature and with increasing proportion of sulphone groups in the polymer chain. Accordingly polymers having a higher proportion of sulphone groups can if desired be produced at slightly lower polymerisation reaction temperatures.

In order to obtain products of decreased absorbance, it may be advantageous to use a prepolymerisation heating stage in which monomers are heated together at 200° to 250°C preferably 220° to 245°C.

To neutralize any reactive oxygen-containing anions, a reagent therefor may be introduced at the termination of the polymerization reaction. Reactive monofunctional halides, for example methyl chloride and reactive aromatic halides for example bis-(4-chlorophenyl) sulphone and 1-benzenesulphonyl-4-chlorobenzene are particularly suitable. The reaction mixture may be (i) allowed to cool and solidify, (ii) ground, (iii) extracted with a solvent for the diaryl sulphone, conveniently with alcohol (e.g. methanol) or acetone, and water, and finally (iv) dried.

Polymeric materials made by the process of the present invention can contain 0 to 25 mole % of sulphone groups in place of ketone groups in the polymer chain, e.g. units having the formula (II). While polyketone homopolymers composed of units of formula (I) are highly crystalline, crystallinity decreases as the proportion of repeat units (II) in the polymer chain increases. A polyketone/sulphone containing less than 10% units (II) crystallizes when quench-cooled from the melt, but those containing 10 to 25% of units (II) generally do not, and require slow cooling or annealing in order to induce crystallinity. However polyketone/sulphones have advantage over polyketone homopolymers in higher glass-rubber transition temperatures which render them more useful in applications where prolonged exposure to high temperature is anticipated.

According to a further aspect of the present invention aromatic polymers are provided having reduced viscosity of 0.8 to 3.0 and absorbance at 550 nm using a 10 mm cell of less than 0.35 [the reduced viscosity and absorbance being measured at 25°C on a solution of the polymer in concentrated sulphuric acid (density 1.84 g/cm$^3$) containing 1 g of polymer in 100 cm$^3$ of polymer in 100 cm$^3$ of solution] and comprising 95 to 75% of units having the formula

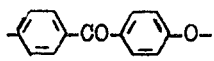

and 5 to 25% of units having the formula

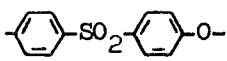

According to a further aspect of the present invention aromatic polymers are provided having reduced viscosity of 0.8 to 3.0 [as measured at 25°C on a solution of the polymer in concentrated sulphuric acid (density 1.84 g/cm$^3$) containing 1 g of polymer in 100 cm$^3$ of solution] and comprising 0 to 95 mole % of units having the formula

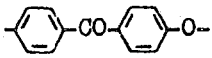

5 to 100 mole % of units having the formula

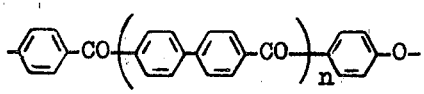

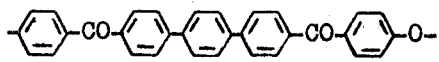

and 0 to 50 mole % of units having the formula

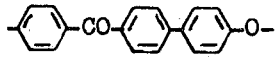

in which $n$ is an integer having the value 1, 2 or 3 and 0 to 25% of the ketone groups may be replaced by sulphone groups.

The polymeric materials made by the process of the present invention may be thermoformed into shaped articles by for example extrusion and moulding e.g. compression-moulding and injection moulding. Such shaped articles include for example films, profiles, tubes, wire insulation and mouldings. The polymeric materials may be mixed with fillers such as molybdenum disulphide, carbon black, and tetrafluoroethylene polymers and copolymers, and the mixtures so formed are particularly useful in bearing applications. Shaped articles may also be fabricated using isostatic moulding techniques. The film may be oriented at a stretching temperature of for example 200° to 300°C and dimensional stability of oriented film, in particular that made from polymer containing 75 to 95 mole % of units (I) and desirably 25 to 5 mole % of units (II), can be improved by heat-setting. Film particularly heat-set film, is useful in applications where high temperatures are anticipated, for example slot liners and dielectrics (e.g. for capacitors) and electrical insulation. In particular the polymeric materials are useful as an electrical insulant for wire; in a preferred method insulation is prepared by preforming a tube of polymer and drawing the tube onto the wire. Mouldings are useful for example in switch gear, transformers, printed circuit boards, and insulators. The polymers can also be melt-spun or wet-spun (e.g. from concentrated sulphuric acid) into a fibre which can be cold drawn. A further application of the polymer is as an adhesive or coating which can be melt-formed or applied from an aqueous or non-aqueous dispersion or emulsion. For use as an adhesive or coating it is particularly preferred that the polymer contains hydroxyl end-groups. Because of the good adhesion to surfaces of other materials, the polymer may be reinforced with fillers for example glass or carbon fibre, or fibres of the polymer may be used as reinforcement for other polymeric material.

The invention is illustrated by the following Examples. Reduced viscosities were measured at 25°C in a solution of polymer in concentrated sulphuric acid (density 1.84 g/cm$^3$) containing 1 g of polymer in 100 cm$^3$ of solution. Absorbance was measured at a wavelength of 550 nm in a 10 mm cell using a solution of polymer in concentrated sulphuric acid as used for reduced viscosity.

EXAMPLE 1

Bis-(4-hydroxyphenyl) ketone (428.4 g; 2.00 mole) was washed (using water) into a polyethylene vessel containing 4 dm$^3$ of 1 M aqueous potassium hydroxide. The mixture was stirred until all the ketone had dissolved and the solution was stored under nitrogen.

A sample (320 g) of the solution was evaporated to dryness in a glass flask to leave the solid hydrated dipotassium salt. This hydrated salt was finely ground. A portion of the hydrated salt was dissolved in water and analysed by titration potentiometrically against 0.1 M sulphuric acid. It was found to contain 89.08% molar of the dipotassium salt of bis-(4-hydroxyphenyl) ketone.

A sample of the above finely ground hydrated dipotassium salt (91.0318 g; 0.2792 mole) was charged together with recrystallized diphenyl sulphone (150 g) to a glass flask (capacity 1 dm$^3$) fitted with stirrer, thermocouple probe, nitrogen purge and air condenser. The flask was flushed with nitrogen and heated on a solder bath at 230°C in order to dehydrate the dipotassium salt. After 1 minute, the pressure in the flask was reduced to 60 torr; after a further 15 minutes at 230°C, stirring was commenced and continued for a further 15 minutes. Water distilled from the resulting yellow slurry. The apparatus was filled with nitrogen and pressure therein increased to atmospheric. Bis-(4-chlorophenyl) ketone (70.6403 g; 0.2813 mole, recrystallized) and diphenyl sulphone (19 g; recrystallized) were added to the slurry. The slurry was heated under nitrogen with stirring at 230°C for 16 hours and then polymerized at 330°C for 6 hours. After 6 hours, crystallized bis-(4-chlorophenyl) sulphone (20 g) was added as end-stop. The reaction mixture was cooled to room temperature, crushed and milled and then boiled twice with acetone, boiled with water (containing 1% volume/volume glacial acetic acid), boiled with water and extracted with acetone/methanol (1:1 by volume), each boiling lasted for 5 minutes. The The polymer was then dried at 135°C for 3 hours at a pressure of 5 torr. The polymer yield was 100.3 g.

The reduced viscosity and absorbance of the polymer were 1.27 and 0.17 respectively. The melt-viscosity was 1.14 kNsm$^{-2}$ at 400°C using a shear of 1000 s$^{-1}$ as measured on a ram extruder. A fibre was cold-drawn from the extrudate.

A tough film was compression-moulded from the polymer at 400°C and placed between two overlapping glass plates. The plates and film were pressed together using a spring clip and heated to 400°C. On cooling to room temperature, the glass broke on attempting to pull the plates apart. In a similar experiment, the glass also broke on attempting to pull the plates apart after immersion of the assembly in acetone for 30 minutes at room temperature.

EXAMPLE 2

A sample of hydrated dipotassium salt of bis-(4-hydroxyphenyl) ketone, finely ground to pass through a sieve having mesh diameter 500 μm, was estimated by titration against standard solution of sulphuric acid in methanol/water (1:1 volume/volume). Accordingly, a sample (0.07463 mole) of the dipotassium salt was weighed into a glass flask (capacity 250 cm$^3$) fitted with stirrer, thermocouple probe, nitrogen purge and an air condenser. Diphenyl sulphone (ground; 40 g; melting point 124° – 125.5°C recrystallized from methanol) was introduced into the flask and powder-blended with the dipotassium salt. The flask was flushed with nitrogen and heated on a solder bath at 230°C. As the diphenyl sulphone melted, the stirrer was started, nitrogen purge at 15 cm$^3$ per minute commenced and the pressure in the flask reduced slowly to 200 torr. The pressure was reduced slowly over a further 15 minutes to about 30 torr. Water distilled from the mixture and a lemon-yellow slurry of the dipotassium salt in diphenyl sulphone remained in the flask. Care was taken to ensure that the diphenyl sulphone did not boil and hence did not splash the dipotassium salt onto the upper walls of the flask. The apparatus was then filled with nitrogen and pressure therein increased to atmospheric. Bis-(4-chlorophenyl) ketone (11.3004 g; 0.04500 mole; melting point 146.0° – 147.0°C distilled and then recrystallized from methyl ethyl ketone), bis-(4-chlorophenyl) sulphone (8.6153 g; 0.03000 mole, melting point 148.0° – 149.0°C recrystallized from iso-propanol) and recrystallized diphenyl sulphone (15.7 g) were added to the flask. A bubbler was fitted to the air-condenser and the solder bath temperature was raised to 290°C. After 30 minutes at 290°C, a cold trap at about −80°C was fitted between the air condenser and the bubbler. The solder bath was maintained at 290°C and the reaction proceeded for 17 hours during which the reaction temperature was close to 290°C, nitrogen purge was maintained at 15 cm$^3$ per minute and a yellow solution of polymer formed in the flask. After the reaction period, the trap was removed and found to contain 0.1078 g of condensate which was largely water. Methyl chloride was then bubbled through the polymer solution for twenty minutes whereupon the reaction mixture became almost colourless. The reaction mixture was cooled to room temperature, ground, extracted three times with methanol, then with hot water, then with hot acetone/methanol (1:1 by volume) and finally dried.

The polymer had a reduced viscosity of 2.57. The solution was pale orange/yellow in colour and free from gelatinous material and had an absorbance of 0.08. The polymer was compression-moulded at 360°C to give a tough opaque film (crystalline) when the mould was allowed to cool to 25°C over 1 hour. When the mould was cooled within 2 minutes a very tough, clear film (amorphous) resulted.

The above procedure was repeated using different sulphones in place of the diphenyl sulphone.

a. Dimethyl sulphone. The procedure of the above example was repeated except that the pressure during dehydration was not taken below 100 torr; there was slight splashing of the dipotassium salt onto the upper inside walls of the flask because in order to ensure efficient dehydration, the dimethyl sulphone had to be allowed to boil. Although the solder bath was maintained at 280°C, the reaction temperature did not rise above 250°C. The following observations were made during the polymerization reaction (the dimethyl sulphone had melting point 108° – 109°C).

i. After 5 minutes, the reaction mixture was brown.

ii. After 10 minutes, the slurry had become paste-like.

iii. After the completion of the polymerization reaction, 1.4 g of material was found to have collected in the cold trap comprising water, methyl mercaptan, carbon disulphide and dimethyl sulphide which suggest decomposition of the solvent. Dimethyl sulphone showed no such decomposition on being heated at 250°C under nitrogen for 18 hours.

After isolation, the polymer was found to have a reduced viscosity of 0.35, the solution being dark brown and containing gelatinous material and having an absorbance >2.0.

b. 1,1-Dioxothiolan. The procedure above with dimethyl sulphone was repeated but using 1,1-dioxothiolan (fractionated: boiling point 91° – 92°C at 0.5 torr). The pressure was not taken below 60 torr; but there was still splashing of the dipotassium salt onto the inside walls of the flask as with dimethyl sulphone [(a) above]. During polymerization which was carried out at 280°C for 17 hours, the following observations were made:

i. After 5 minutes, the reaction mixture was dark brown.

ii. After 1 hour, the cold trap contained 0.5 g of volatile material which was subsequently shown to contain water, sulphur dioxide and an olefine containing 4 carbon atoms which suggests decomposition of the solvent.

After isolation, the polymer was found to have a reduced viscosity of 0.28, the solution being dark brown but free of gel, and having an absorbance of >2.0.

c. Ditolyl sulphone. The above procedure was repeated using ditolyl sulphone (boiling point 405°C at atmospheric pressure). There was no splashing of dipotassium salt onto the inside walls of the flask. The polymer formed was found to have a reduced viscosity of 0.18, the solution having an absorbance of >2.0. The cold trap contained 1.5 g of condensate which was found to consist mainly of water, sulphur dioxide and toluene (0.9 g).

d. Methyl phenyl sulphone. The above procedure was repeated using methyl phenyl sulphone in place of diphenyl sulphone. The sulphone did not boil and no splashing of di(alkali metal) salt on to the walls of the flask occurred. The copolymer formed was found to have a reduced viscosity of 0.17. The solution was gel-free and had absorbance >2.0. The cold trap contained water, sulphur dioxide and benzene. Further solvents were evaluated as shown in Tables 1 and 2.

TABLE 1

| Solvent | Experiment |
|---|---|
| benzophenone | e |
| dibenzothiophen | f |
| bis-(4-phenoxyphenyl) sulphone | g |
| N,N-diphenyl acetamide | h |
| hexamethyl phosphoramide | i |
| dibenzothiophen dioxide | j |
| phenoxathiin dioxide | k |
| 4-phenylsulphonylbiphenyl | l |

TABLE 2

| | e | f | g | h | i | j | k | l |
|---|---|---|---|---|---|---|---|---|
| Solvent boiling point (°C) | 306 | >300 | >300 | >300 | 238 | >300 | >300 | >300 |
| Appearance of polymer solution (1% w/v in concentrated sulphuric acid) | gel-free | gel-free | gel-free | insoluble | insoluble | gel-free | gel-free | gel-free |
| Reduced viscosity | 0.14 | <0.1 | 0.14 | — | — | 1.49 | 1.22 | 1.35 |
| Absorbance | 0.10 | — | 0.09 | >2.0 | >2.0 | 0.30 | 0.31 | 0.10 |
| Trap content | | | | | | | | |
| Weight | 0.02g | 0.1g | — | 0.32g | >1g | — | 0.05g | — |
| Material trapped | water | water | — | acetone | trimethyl amine | — | water | — |
| Comments | | product soluble in acetone | | | polymerized under reflux | * | * | * |

* fall within the scope of the present invention.

The polymer had a reduced viscosity of 1.87. The solution was gel-free, pale yellow and had an absorbance of 0.13. The polymer was compression-moulded at 410°C at a pressure of 4 MN/m² (20 tons over 9 inch square platen) for 3 minutes followed by cooling to give a very tough, opaque film.

For comparison, a polymer was prepared by heating the anhydrous potassium salt of 4-(4-chlorobenzoyl) phenol (11 g) in recrystallized diphenyl sulphone (11.8 g) at 300°C for 23.5 hours in an apparatus as described in Example 2 and polymer was extracted as described in Example 2. The polymer, having units of formula I, had a reduced viscosity of 1.21 and absorbance of 0.37. A film formed by compression-moulding the polymer at 400°C was brittle.

EXAMPLE 3

A sample of the dipotassium salt of bis-(4-hydroxyphenol ketone was ground and estimated by the method of Example 2, having been dried by heating at 120°C in vacuo (about 0.01 torr) for 24 hours. A portion (0.1724 moles) of the sample was charged as ground powder having particle sizes similar to that in Example 2 to a flask as described in Example 2 but having capacity 100 cm³. Recrystallized diphenyl sulphone (15.77 g) and bis-(4-fluorophenyl) ketone [3.7586 g; 0.01724 moles; melting point 105.5° – 106.5°C; recrystallized twice from petroleum ether (boiling point 90° – 120°C)] was added to the flask which was then purged with nitrogen at atmospheric pressure. The flask and contents were then heated at 330° – 340°C on a solder bath for 2 hours, after which the reaction mixture was very viscous, pale yellow slurry/solution. The mixture was cooled to room temperature and polymer extracted as described in Example 2.

EXAMPLE 4

The procedure of Example 2 using diphenyl sulphone was repeated except that the polymerization reaction was carried out at 320°C and that concentrations of monomers were chosen so as to produce polymer consisting of units of I and II in molar ratio 95:5. The proportion of dipotassium salt to dihalo compound was varied in order to show the effect on absorbance at 550 nm and reduced viscosity. The polymers were extracted as described in Example 2 and compression-moulding into film at 400°C. The compositions and results are presented in the following Table.

Polymer D was extruded at 400°C onto stranded (19 strands) nickel plated copper wire to form an insulation. The insulated wire could be wound round on its own diameter without cracking the insulation. The insulation was not affected by common organic solvents and hydraulic fluids.

TABLE

| MONOMER | | A | B | C | D |
|---|---|---|---|---|---|
| Dipotassium salt | (moles) | 0.07544 | 0.07463 | 0.07444 | 0.07425 |
| | (% molar) | 50.15 | 49.88 | 49.83 | 49.75 |
| Bis(4-chlorophenyl) ketone | (moles) | 0.06750 | 0.06750 | 0.06750 | 0.06750 |
| | (% molar) | 44.86 | 45.11 | 45.16 | 45.22 |
| Bis(4-chlorophenyl) sulphone | (moles) | 0.00750 | 0.00750 | 0.00750 | 0.00750 |
| | (% molar) | 4.99 | 5.01 | 5.01 | 5.03 |
| Total dihalo monomer concentration | (moles) | 0.07500 | 0.07500 | 0.07500 | 0.07500 |
| | (% molar) | 49.85 | 50.12 | 50.17 | 50.25 |
| POLYMER | | | | | |
| Reduced viscosity | | 1.67 | 2.48 | 1.78 | 1.27 |
| Absorbance | | 1.84 | 0.31 | 0.15 | 0.11 |
| Moulding quality | | brittle | tough | very tough | tough |

EXAMPLE 5

Copolymers consisting of units of formulae I and II in molar ratio 95:5 were prepared to show the effect on copolymer properties of a variation of diphenyl sulphone concentration and hence copolymer concentration during polymerization.

A sample of hydrated dipotassium salt of bis-(4-hydroxyphenyl) ketone was prepared and estimated as described in Example 2 and 0.0778 moles (equivalent to 25.4753 g of pure bisphenate) were charged together with recrystallized diphenyl sulphone (42 g) to a glass flask (capacity 250 cm$^3$) fitted with stirrer, thermocouple probe, nitrogen purge and air condenser. The flask was flushed with nitrogen and heated on a solder bath at 230°C in order to dehydrate the dipotassium salt. After one minute, the pressure in the flask was reduced to 60 torr; after a further 15 minutes at 230°C, stirring was commenced and continued for a further 15 minutes. Water distilled from the resulting yellow slurry. The apparatus was filled with nitrogen and pressure therein increased to atmospheric. Bis-(4-chlorophenyl) ketone (17.6696 g: 0.0704 mole, recrystallized), bis-(4-chlorophenyl) sulphone (2.2451 g; 0.0078 mole; recrystallized) and diphenyl sulphone (5 g; recrystallized) were added to the slurry.

The slurry was heated under nitrogen with stirring at 230°C for 18 hours and then polymerized at 320°C for 360 minutes with samples taken after 100, 160 and 210 minutes.

For isolation of the polymer from the samples and after complete polymerization (360 minutes), the reaction mixture was cooled to room temperature, and then successively boiled twice with acetone, boiled with water containing 1% by volume glacial acetic acid, boiled with water, and boiled with methanol, each boiling lasted for 30 minutes. The polymer was then dried at 140°C for 3 hours at a pressure of 5 torr. The polymer after complete polymerization was labelled "polymer A".

The reduced viscosities and absorbances of the samples and of polymer A are presented in the following table.

| Polymerization time (minutes) | Reduced viscosity | Absorbance |
| --- | --- | --- |
| 100 | 1.43 | 0.13 |
| 160 | 1.93 | 0.14 |
| 210 | 1.94 | 0.14 |
| 360 (polymer A) | 2.11 | 0.14 |

The molecular weight of the "copolymer repeat unit" is 198.01.

Weight of copolymer formed = C = 2 × 0.0778 × 198.01 g.

The percentage concentration of copolymer in polymerization mixture (by weight)

$$= \frac{C}{D+C} \times 100$$

where D is the total weight of diphenyl sulphone.

For polymer A, percentage copolymer concentration $$= \frac{2 \times 0.0778 \times 198.01}{47 + 2 \times 0.0778 \times 198.01} \times 100$$

$$= 40$$

The above polymerization procedure was repeated but with copolymer concentration of 30% (polymer B) and 35% by weight, achieved by varying the concentration of diphenyl sulphone used in the dehydration of the dipotassium salt of bis-(4-hydroxylphenyl) ketone. From the results shown in the following table, slight increase in copolymer concentration is associated with an increase in copolymer reduced viscosity without undue increase in copolymer absorbance.

| Copolymer concentration (% by weight) | Reduced Viscosity | Absorbance |
| --- | --- | --- |
| 30 (polymer B) | 1.07 | 0.08 |
| 35 | 1.47 | 0.14 |
| 40 (polymer A) | 2.11 | 0.14 |

EXAMPLE 6

The procedure of Example 5 was repeated using a copolymer concentration of 30% by weight except that to prepare polymer E, the prepolymerization stage was omitted and polymerization was effected by heating at 320°C for 18 hours, and to prepare polymer F, the monomers were heated at 230°C gradually increasing over 6 hours to 320°C followed by heating at 320°C for 18 hours.

The results presented below show that the use of a prepolymerization heating stage is associated with a decrease in absorbance without decrease in reduced viscosity.

| Polymer | Reduced Viscosity | Absorbance |
| --- | --- | --- |
| B (Example 5) | 1.07 | 0.08 |
| E | 1.07 | 0.98 |
| F | 1.04 | 0.34 |

EXAMPLE 7

Biphenyl (77 g: 0.5 mole) and 4-chlorobenzoyl chloride (175 g; 1 mole) were dissolved in nitrobenzene (100 cm$^3$) in a glass flask (capacity 500 cm$^3$) fitted with nitrogen purge, condenser and stirrer and ferric chloride added (3 g; resublimed). The mixture was heated to 140°C and the reaction was followed by estimation of evolved hydrochloric acid (using titration against standardised sodium hydroxide solution). After about 85% completion of the reaction, the dark-violet reaction mass which contained some while crystals was poured into methanol (200 cm³) into which some acetyl acetone (2 g) had been dissolved. The product was filtered, washed with methanol and methyl ethyl ketone and finally recrystallized from dimethyl sulphoxide. The white crystals (38 g) had melting point 303° to 304°C and infra-red and nuclear magnetic resonance spectra consistent with the formula

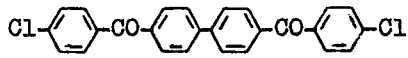

Polymer having reduced viscosity of 1.2 [as measured at 25°C in concentrated sulphuric acid (density 1.84) solution containing 1 g of polymer in 100 cm³ of solution] was prepared by heating anhydrous dipotassium salt of bis-(4-hydroxyphenyl) ketone (0.0746 moles) and the above dichloride (0.0300 moles) and bis-(4-chlorophenyl) ketone (0.0450 moles for 17 hours. The absorbance of the sulphuric acid solution at 550 nm on a 10 mm cell was 1.49.

EXAMPLE 8

The apparatus described in Example 5 was used to prepare a copolymer comprising 90 mole % of units having the formula I and 10 mole % of units having the formula

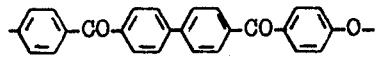

A sample of hydrated dipotassium salt of bis-(4-hydroxyphenyl) ketone was estimated as described in Example 2 and an amount equivalent to 0.06486 moles of pure bisphenate were charged with diphenyl sulphone (34 g, recrystallized) to the flask and dehydrated. After dehydration, as described in Example 5, bis-(4-chlorophenyl) ketone (0.05215 mole, 13.0957 g recrystallized), 4,4'-bis-(4-chlorobenzoyl) biphenyl (0.01304 mole, 5.6232 g, recrystallized) and diphenyl sulphone (5 g recrystallized) were charged to the flask, heated at 230°C for 16.75 hours with stirring under nitrogen and then polymerized at 330°C for 7 hours. After polymerization bis-(4-chlorophenyl) sulphone (2 g) was added. The polymer was extracted as described in Example 5 and had reduced viscosity of 1.45 and absorbance of 0.44. A sample of the polymer was compression-moulded at 420°C into film and cooled slowly. The resulting opaque film was tough and was creased repeatedly in all directions without cracking.

EXAMPLE 9

The procedure of Example 8 was repeated to produce a polymer comprising 90 mole % of units having formula I and 10 mole % units having the formula

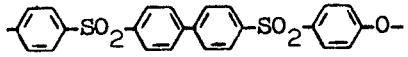

except that the dehydration mixture comprised hydrated dipotassium salt of bis-(4-hydroxyphenyl) ketone equivalent to 0.06858 moles of pure bisphenate and recrystallized diphenyl sulphone (36 g) and that the monomers added to the mixture comprised bis-(4-chlorophenyl) ketone (0.05514 mole, 13.8463 g, recrystallized), 4,4'-bis-(4-chlorophenylsulphonyl) biphenyl (0.01378 mole, 6.9394 g, recrystallized from dimethyl sulphoxide) and diphenyl sulphone (5 g, recrystallized); the mixture was heated at 230°C for 17.75 hours and polymerized at 330°C for 7 hours. The resulting polymer (23.1 g) had a reduced viscosity of 1.18 and absorbance of 0.53, and film compression-moulded therefrom at 420°C and then cooled slowly was tough and could be creased repeatedly in all directions without cracking.

I claim:
1. A process for the preparation of aromatic polymers having reduced viscosity of between 0.8 and 3.0, as measured at 25°C on a solution of polymer in concentrated sulphuric acid of density 1.84 g/cm³ containing 1 g of polymer in 100 cm³ of solution, which comprises heating at a temperature of 250°C to 400°C a monomer mixture comprising
  1. 49 to 50% molar of a di(alkali metal) salt of at least one bisphenol selected from

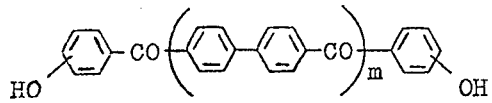

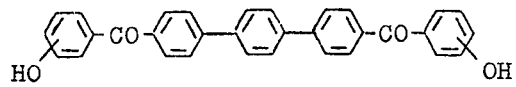

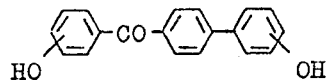

at least 95% of the phenolic OH groups being in the para position, and
  2. 51 to 50% molar of at least one dihalo compound selected from

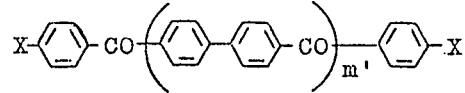

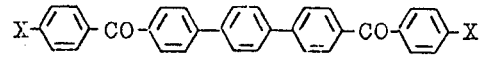

where X is F, Cl or Br, and each of m and m' is zero, 1, 2 or 3, and the molar percentages of said di(alkali metal) salt and said at least one dihalo compound sum to 100%, and in which monomeric mixture 0 to 25 mole % of the —CO— groups are replaced by sulphone groups, said di(alkali metal) salt being present as a suspension in a diaryl sulphone having the formula

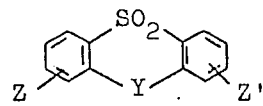

in which Y is a direct link, an oxygen atom or two hydrogen atoms (one attached to each benzene ring) and Z and Z' are selected from hydrogen atoms and phenyl groups and may be the same or different.

2. A process according to 1 in which the monomer mixture is heated in a prepolymerization stage at 200° to 250°C.

3. A process according to claim 1 in which the dialkali metal salt is dehydrated in the polymerization vessel in the presence of at least some of the diaryl sulphone at a temperature of greater than 150°C and below the boiling point of the diaryl sulphone before addition of the dihalo compound.

4. A process according to claim 1 in which the polymerization is carried out at temperatures of 280° to 350°C.

5. A process according to claim 1 in which the polymer concentration in the diaryl sulphone is 35% to 40% by weight.

6. A process according to claim 1 in which the dihalo compound is present in 0.1 to 1.0 mole % excess over the dialkali metal salt of the bisphenol.

7. A process according to claim 1 in which the dialkali metal salt of the bisphenol has a particle size of less than 500 μm.

8. A process according to claim 1 in which the monomer mixture consists of a dialkali metal salt of the bisphenol having the formula

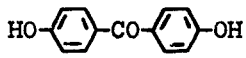

and a dihalo compound having the formula

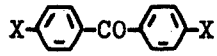

9. A process according to claim 1 in which the monomer mixture consists of a dialkali metal salt of the bisphenol having the formula

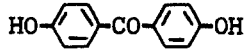

and dihalo compounds having the formulae

10. A process according to claim 1 in which the alkali metal is potassium.

11. A process according to claim 15 in which the diaryl sulphone is diphenyl sulphone.

12. A process according to claim 1 in which reactive oxygen containing anions are neutralized at the termination of the polymerization reaction by introducing a reactive halide into the reaction mixture.

13. A polymer having reduced viscosity of 0.8 to 3.0 and absorbance at 550 nm using a 10 mm cell of less than 0.35, the reduced viscosity and absorbance being measured at 25°C on a solution of the polymer in concentrated sulphuric acid (density 1.84 g/cm$^3$) containing 1 g of polymer in 100 cm$^3$ of solution, and comprising 95 to 75 mole % of units having the formula

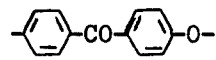

and 5 to 25% of units having the formula

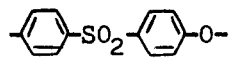

14. A polymer having reduced viscosity of 0.8 to 3.0, as measured at 25°C on a solution of the polymer in concentrated sulphuric acid (density 1.84 g/cm$^3$) containing 1 g of polymer in 100 cm$^3$ of solution, and comprising 0 to 95 mole % of units having the formula

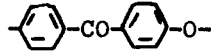

5 to 100 mole % of units having the formula

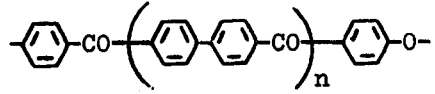

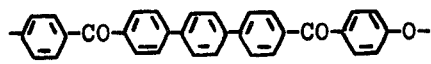

and 0 to 50 mole % of units having the formula

in which $n$ is an integer having the value 1, 2 or 3 and 0 to 25 mole % of the ketone groups are replaced by sulphone groups.

* * * * *